US010664779B2

(12) United States Patent
Gura et al.

(10) Patent No.: US 10,664,779 B2
(45) Date of Patent: May 26, 2020

(54) MANAGING CROSS PROJECT DEPENDENCIES IN PROJECT MANAGEMENT APPLICATIONS

(71) Applicant: International Business Machines Corporation, Armonk, NY (US)

(72) Inventors: Gerald A. Gura, Cary, NC (US); Robert E. Roth, Matthews, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1046 days.

(21) Appl. No.: 14/927,670

(22) Filed: Oct. 30, 2015

(65) Prior Publication Data

US 2017/0124499 A1 May 4, 2017

(51) Int. Cl.
*G06Q 10/06* (2012.01)
(52) U.S. Cl.
CPC .............. *G06Q 10/06313* (2013.01)
(58) Field of Classification Search
None
See application file for complete search history.

(56) References Cited

U.S. PATENT DOCUMENTS

| | | | | |
|---|---|---|---|---|
| 2002/0184250 A1* | 12/2002 | Kern | ...... | G06Q 10/06 |
| 2006/0070020 A1* | 3/2006 | Puttaswamy | ...... | G06Q 10/06 |
| | | | | 717/101 |
| 2010/0031262 A1* | 2/2010 | Baird-Gent | ...... | G06Q 10/06 |
| | | | | 718/102 |
| 2011/0184771 A1 | 7/2011 | Wells | | |
| 2012/0278120 A1 | 11/2012 | Insko et al. | | |
| 2014/0122161 A1 | 5/2014 | Gupta et al. | | |
| 2014/0032256 A1 | 6/2014 | Hess et al. | | |

FOREIGN PATENT DOCUMENTS

WO WO-2012148681 A1 * 11/2012 ........... G06Q 10/067

OTHER PUBLICATIONS

Cecil Eng Huang Chua and Adrian Yong Kwang Yeow, "Artifacts, Actors, and Interactions in the Cross-Project Coordination Practices of Open-Source Communities," Dec. 2010, Journal of the Association for Information Systems, vol. 11, Special Issue, pp. 838-867 (Year: 2010).*

* cited by examiner

Primary Examiner — Amanda Gurski
(74) Attorney, Agent, or Firm — Garg Law Firm, PLLC; Rakesh Garg; James Nock

(57) ABSTRACT

In a first project management application, a GET object is created to obtain a deliverable product used in a task, the first project management application managing a dependent plan, the dependent plan including the task. In the GET object, a first field is populated using a project-wide unique plan identifier associated with a delivering plan. To form a logical link in the GET object, a second field is populated using a project-wide unique link identifier associated with a link for the deliverable product between the dependent plan and the delivering plan. In the delivering plan, a construction of a GIVE object is caused corresponding to the deliverable product. To form an actual link in the GET object, a third field is populated with a reference to a GIVE object in the delivering plan. A dependency for the deliverable product is managed using the actual link and the logical link.

20 Claims, 5 Drawing Sheets

MANAGING CROSS PROJECT DEPENDENCIES IN PROJECT MANAGEMENT APPLICATIONS

TECHNICAL FIELD

The present invention relates generally to a method, system, and computer program product for project management using project management and planning applications. More particularly, the present invention relates to a method, system, and computer program product for managing cross-project dependencies in project management applications.

BACKGROUND

Project management is the process of managing the various tasks in a given project. Some tasks produce outputs called deliverables. For example, a deliverable of a construction task is a constructed structure. As another example, a deliverable of a software coding task is the code for the software.

Some tasks in a project depend on other tasks. For example, the construction task of an above ground structure of a building cannot be started in a construction project until the construction task of the below ground foundation is completed. As another example, a software product cannot be tested before the software is coded.

A Project Management (PM) application is a software tool, which facilitates the planning of the various tasks in a project. For example, among other functions, a project management application configures the dependencies between the tasks in a project plan, and tracks the deliverables from the tasks in the project plan. A project plan is a manner of identifying, representing, and arranging the tasks of a project in a project management application.

SUMMARY

The illustrative embodiments provide a method, system, and computer program product for managing cross-project dependencies in project management applications. An embodiment creates, using a processor, in a first project management application, a GET object to obtain a deliverable product used in a task, the first project management application managing a dependent plan, the dependent plan including the task. The embodiment populates, in the GET object, a first field using a project-wide unique plan identifier associated with a delivering plan. The embodiment populates, to form a logical link in the GET object, a second field using a project-wide unique link identifier associated with a link for the deliverable product between the dependent plan and the delivering plan. The embodiment causes, in the delivering plan, a construction of a GIVE object corresponding to the deliverable product. The embodiment populates, to form an actual link in the GET object, a third field with a reference to a GIVE object in the delivering plan. The embodiment manages a dependency for the deliverable product using the actual link and the logical link.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
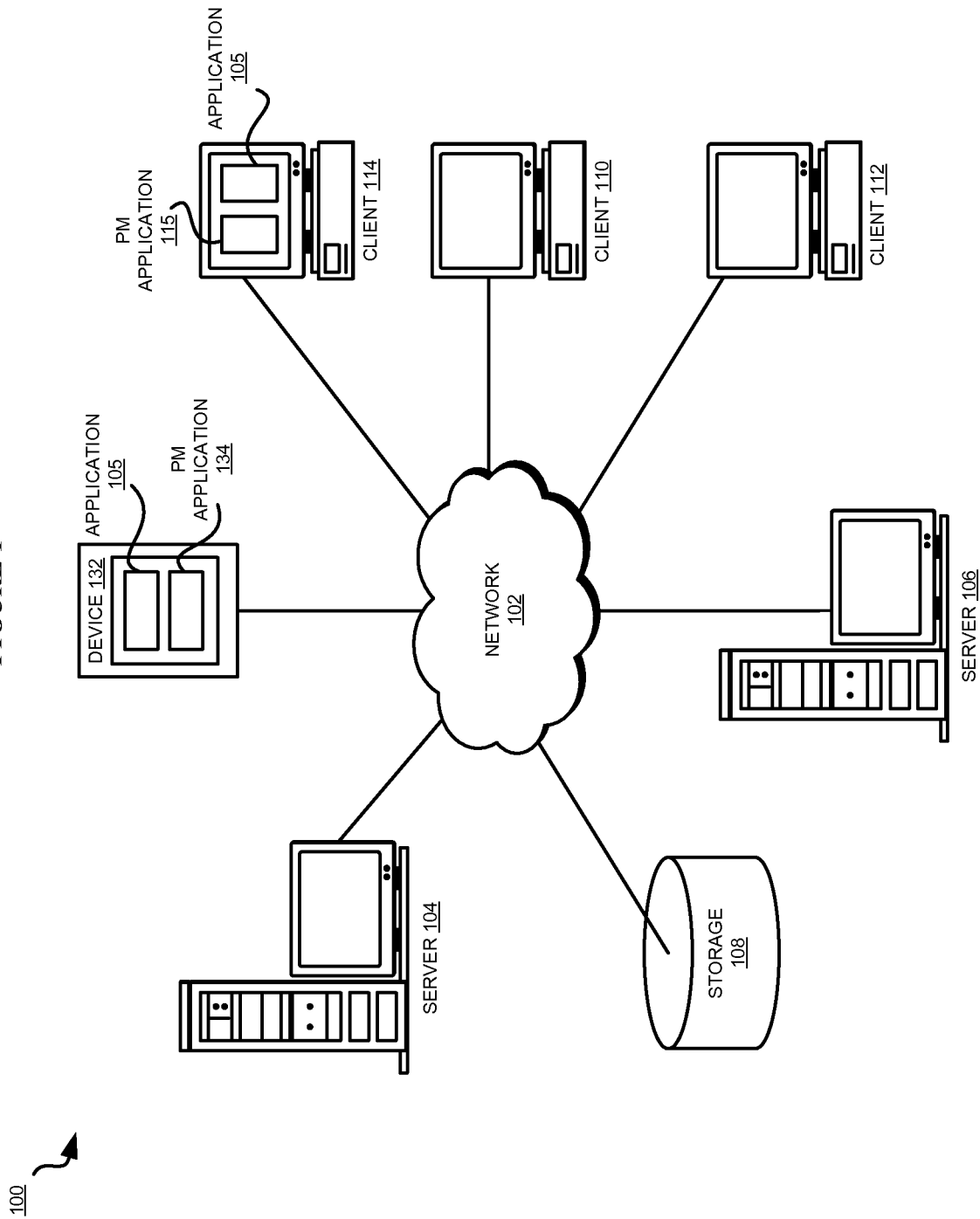
FIG. 1 depicts a block diagram of a network of data processing systems in which illustrative embodiments may be implemented.

The illustrative embodiments recognize that a single complex project is often managed using a number of separate subprojects. In such projects, a master project plan is divided into several project plans, each project plan relating to a subproject.

The illustrative embodiments further recognize that in such circumstances, the various project plans are managed by different project managers who maintain and update their respective project plans for their respective sub projects. Furthermore, the different project plans may reside on different machines and are updated on those different machines.

The illustrative embodiments further recognize that a task within one project plan can have dependencies on other tasks in other project plans. For example, a task in one project plan may produce a deliverable, which might be a pre-requisite for another task in another project plan. As another example, a task in one project plan may need a deliverable that is not produced within that project plan and whether another project plan produces the needed deliverable is not known.

The illustrative embodiments recognize that while managing the dependencies within a project plan is within the capabilities of an existing project management application, establishing cross-project dependencies between the tasks in different project plans is still relegated to humans. Particularly, using the presently available project management applications, one or more project managers have to coordinate the cross project dependencies manually through meetings and consultation. For examples, presently, various project managers responsible for various project plans meet and present their needs for deliverables from other projects. A project manager who can deliver a needed deliverable coordinates manually with a project manager of a project that needs that deliverable. Thereafter, the project managers periodically meet to check the status of the dependencies, maintain the integrity of the humanly negotiated cross-project relationships, and update each other with the developments relating to the cross-project relationships throughout the project cycle.

Some presently available project management applications do provide some cross-project linking features. However, the illustrative embodiments recognize that such features continue to rely upon the personal knowledge of the project managers. For example, to create a cross-link from one project to another project, the project manager of the project needing the deliverable has to know where that deliverable is produced, when that deliverable will be produced, and that the project manager of the other project is aware of the need for the deliverable outside their project. Again, presently, the project managers have to manually coordinate such cross-project links, and continue managing them manually through the life of the project.

The illustrative embodiments recognize that such a manual process for creating cross-project links suffers from several drawbacks. For example, such a method heavily relies on the skill and knowledge of human project managers, who may bring different levels of skills and knowledge to their projects. As another example, even when a cross-project link is initially negotiated between project managers, such a link has to be manually added and tracked in the disjoint project plans of the connected projects. When a project plan of one project migrates to a new version, or is updated, it is easy for the manually added cross-linking information to be dropped or corrupted.

The illustrative embodiments used to describe the invention generally address and solve the above-described problems and other problems related to managing projects that are related to other projects. The illustrative embodiments provide a method, system, and computer program product for managing cross-project dependencies in project management applications.

An embodiment can be implemented as a software application. The application implementing an embodiment can be configured as a modification of an existing project management application, as a separate application that operates in conjunction with an existing project management application, a standalone application, or some combination thereof.

In accordance with the illustrative embodiments, when subprojects of a project are managed in different project plans, each project plan of each subproject is identified by an identifier, which is unique within the project. Furthermore, the unique identifier of a project plan of a subproject is configured such that the identifier is sufficient to identify a deliverable, a type of deliverable, or both, that are produced in the project. As a simple example, a project plan of a financial subproject, which manages the financial aspects of a project, may be assigned an identifier "financial". Identifier "financial" may be sufficient to indicate to an "operations" subproject manager that a financial report deliverable can be obtained from the financial subproject.

Of course more complex identifiers can be constructed to provide more details in more complex subprojects. For example, in the above example, identifier "financial: sales report, annual budget, departmental budget, project budget report, project expense reports" may be assigned to a project plan of a financial subproject and "marketing: promotions budget, target analysis report" may be assigned to a project plan of a marketing subproject. Now, an operations subproject manager can know that even though he needs a budget report deliverable and most budget reports are obtainable from the financial subproject, if the budget pertains to promotions, that report will not be available from the financial subproject but from the marketing subproject.

These examples of identifiers of the project plans of subprojects are not intended to be limiting. From this disclosure, those of ordinary skill in the art will be able to conceive many other manners of constructing similarly purposed identifiers and the same are contemplated within the scope of the illustrative embodiments.

An embodiment detects that a dependency is being created in a project plan of a subproject that requires a deliverable from another project plan of another subproject. The embodiment obtains or creates a list of unique identifiers of the subprojects known within the project. The embodiment selects, or otherwise enables the selection of an identifier of a suitable identifier, which identifies a project plan of a subproject from which the needed deliverable can be obtained.

The embodiment further creates a link identifier. A link identifier is a unique identifier within the project, which identifies a link or relationship between two project plans. For example, plan P1 for subproject S1 needs deliverable D1 from plan P2 of subproject S2. This cross-project dependency can be identified using an identifier that is unique within the project, e.g., "ABC123". Plan P1 for subproject S1 may also need deliverable D2 from plan P3 of subproject S3. This cross-project dependency can be identified using another identifier that is unique within the project, e.g., "ABC124", and so on.

These examples of identifiers of the cross-project links are not intended to be limiting. From this disclosure, those of ordinary skill in the art will be able to conceive many other manners of constructing similarly purposed identifiers and the same are contemplated within the scope of the illustrative embodiments.

A project plan that is requesting a deliverable from another project plan is referred to herein as a dependent plan. A project plan that is supplying a deliverable requested by a dependent plan is referred to herein as a delivering plan.

An embodiment constructs a GET object in a dependent plan. The embodiment associates the GET object with a task in the dependent plan, where the task is dependent upon the receipt of the deliverable. A GET object is a data structure in a dependent plan. A GET object includes at least three values, and can include more depending on the particular implementation. A FROM value in the GET object is populated with the project-wide unique identifier of the delivering plan. An IDENTIFIER or ID value in the GET object is populated with the project-wide unique identifier of the link between the dependent plan and the delivering plan for a particular deliverable. A LINK value in the GET object is populated with the project management application-specific manner of linking data objects in the project management application, e.g., by using a pointer to a linked data object. Particularly, the LINK value is populated with a value, e.g., a pointer value, of a GIVE object in the delivering plan. An additional value in the GET object may specify a name or a type of deliverable being requested using the link.

A GIVE object is a data structure in a delivering plan. A GIVE object includes at least three values, and can include more depending on the particular implementation. A TO value in the GIVE object is populated with the project-wide unique identifier of the dependent plan. An IDENTIFIER or ID value in the GIVE object is populated with the project-wide unique identifier of the link between the dependent plan and the delivering plan for a particular deliverable. A LINK value in the GIVE object is populated with the project management application-specific manner of linking data objects in the project management application, e.g., by using a pointer to a linked data object. Particularly, the LINK value is populated with a value, e.g., a pointer value, of a GET object in the delivering plan. Additional values in the GIVE object may specify other attributes of the deliverable being delivered which may include, but are not limited to, the name, type, and description of the deliverable. By creating the GET and GIVE objects, an embodiment provides a mechanism to create a link between two tasks in two different plans, without having yet to specifically identify the tasks—which may or may not yet exist—that are to be linked.

Assume as a non-limiting example that dependent plan P1 needs deliverable D1 from delivering plan P2. P1 and P2 are linked with each other for deliverable D1. P1 has the unique identifier "project A: construction ABC" and P2 has the unique identifier "financial: sales report, annual budget, departmental budget, project budget report, project expense reports".

For this link, the FROM value of the GET object has The ID value "financial: sales report, annual budget, departmental budget, project budget report, project expense reports", and the FROM value of the GIVE object has The ID value "project A: construction ABC". The ID values of the GET and GIVE are identical for the link, e.g., "ABC123". The LINK value field of the GET object holds a pointer to the GIVE object in plan P2, and the LINK value field of the GIVE object holds a pointer to the GET object in plan P1.

An embodiment performs additional operations before constructing a GIVE object in a delivering project. For example, the embodiment detects that a GET object has been constructed in a dependent project where the GET object has used the delivering project's unique identifier. This detection can be accomplished in any suitable manner in a given implementation, including but not limited to detecting a creation of a reference to the delivering project using an identifier of the delivering project in the master project.

When the embodiment detects that a GET object has been created using the delivering project's unique identifier, the embodiment validates whether the delivering project actually produces the deliverable that is requested. If that deliverable is produced or available in the delivering plan, the embodiment allows the construction of the GIVE object to proceed in the delivering plan. The embodiment associates the GIVE object with a task in the delivering plan, where the deliverable is produced or obtainable from the task.

If that deliverable is not produced or available in the delivering plan, the embodiment does not construct the GIVE object in the delivering plan and notifies the dependent plan of a failed cross-project linking. Such a situation can arise when a GET object is erroneously created in a dependent plan, when a correctly created GET object is erroneously populated with an incorrect delivering plan identifier, or when the delivering plan is unable to produce the deliverable for any reason.

From time to time, periodically, or upon certain events, as the case may be in a particular implementation, an embodiment further manages the link created using the GET object and the GIVE object. For example, the dependent plan and the delivering plan are each time-stamped or otherwise versioned through the life of their respective subprojects. In a link validation operation, the embodiment ensures that a GET object continues to be linked with the correct corresponding GIVE object when a delivering plan is revised, and vice versa.

In one embodiment, the link validation uses the timestamps of versions of the delivering plan to select the version of the delivering plan currently in use. The embodiment then locates the GIVE object in that version and ensures that the pointer data in the link value points correctly to the corresponding GET object, and the value in the link identifier field matches with the value in the link identifier field of the GET object. The embodiment performs a similar link validation operation when a dependent plan goes through revisions and versioning.

In some cases the link value cannot be restored when a plan is revised. Assume for example, that the delivering plan is moved to a new machine from which the machine where the dependent plan resides is not accessible. Therefore, the pointer in the link value of the GIVE object may not correctly find or point to the corresponding GET object. In this and other cases where project management application-specific link cannot be restored, an embodiment uses the link identifier value as a logical link between the GIVE object and the GET object. Regardless of whether the two objects can be linked within the project management application in the project management application-specific manner, the two objects are logically linked with each other because each of them has the same link identifier that is associated with the link.

The embodiment performs the link validation in this manner whether the dependent plan is changed, the delivering plan is changed, or both plans are changed. This manner of restoring or re-pairing the GET object and the GIVE object link provides robustness to the cross-project linking according to the illustrative embodiments.

A method of an embodiment described herein, when implemented to execute on a device or data processing system, comprises substantial advancement of the functionality of that device or data processing system in managing cross-project dependencies. For example, a prior-art method of project management requires personal knowledge of project managers and manual negotiations between project managers to form and maintain cross-project dependencies. An embodiment systematically creates cross-project dependencies upon automatic validation of the dependency. An embodiment automatically, and without human intervention, maintains the linkage for the dependency even as the dependent and/or delivering plans change or migrate. This manner of managing cross-project dependencies in project management applications is unavailable in the prior-art. Thus, a substantial advancement of such devices or data processing systems by executing a method of an embodiment is in enabling correct cross-project dependencies to be formed and maintained between subprojects of a large project without depending on the personal skill or knowledge of the managers of the linked subprojects.

The illustrative embodiments are described with respect to certain project management application, projects, subprojects, plans, tasks, deliverables, objects, data structures, values, identifiers, linkages, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
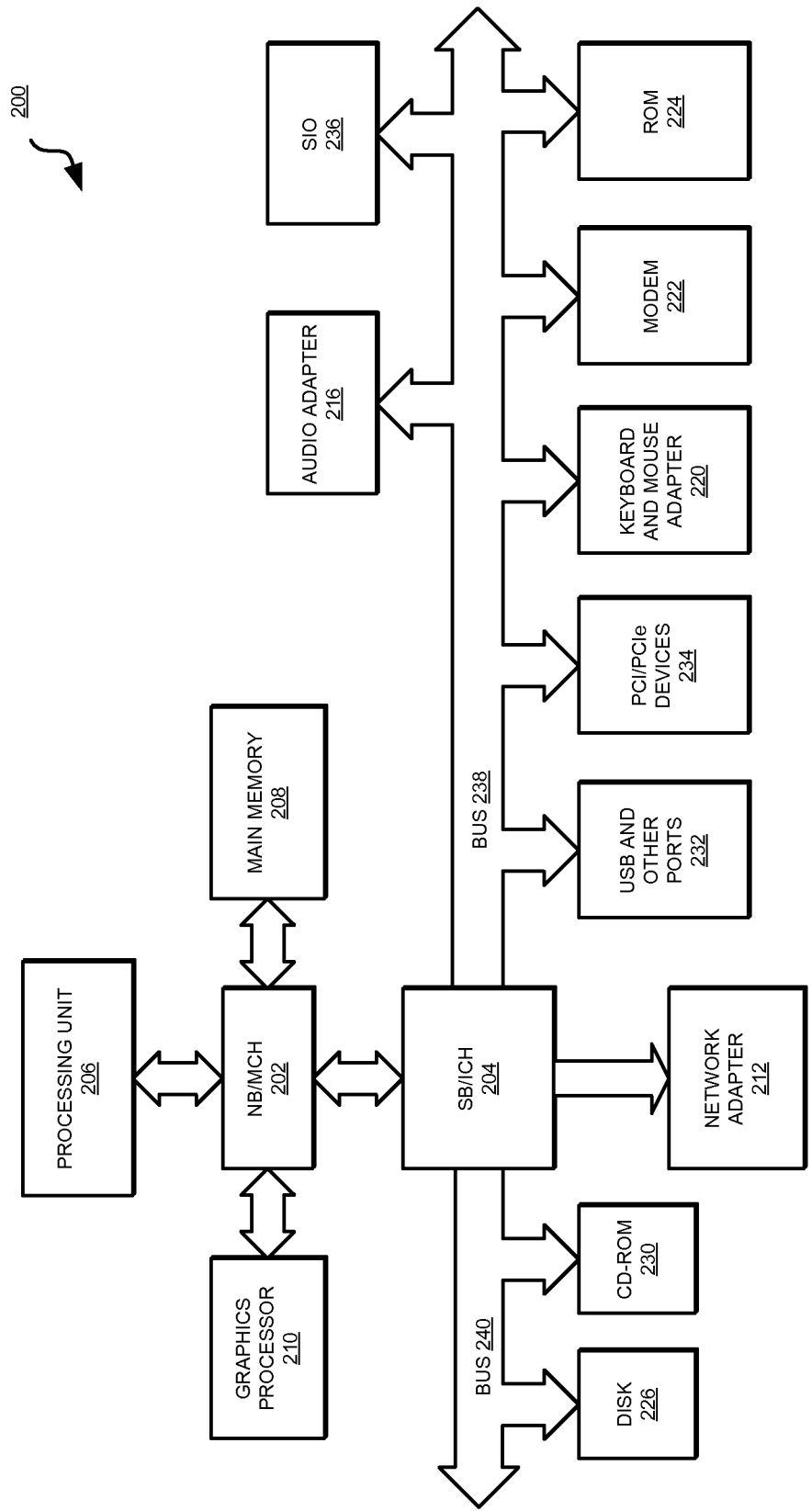
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. For example, suppose that project management application 115 manages a dependent plan for a subproject on client 114, and project management application 134 manages a delivering plan for another subproject on device 132. An instance of application 105 executes on client 114 or on another machine (not shown) accessible from client 114, to operate with project management application 115. Another instance of application 105 executes on device 132 or on another machine (not shown) accessible from device 132, to operate with project management application 134. Application 105 on client 114 and application 105 on device 132 operate in a manner described herein for managing cross-project dependencies in project management applications.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
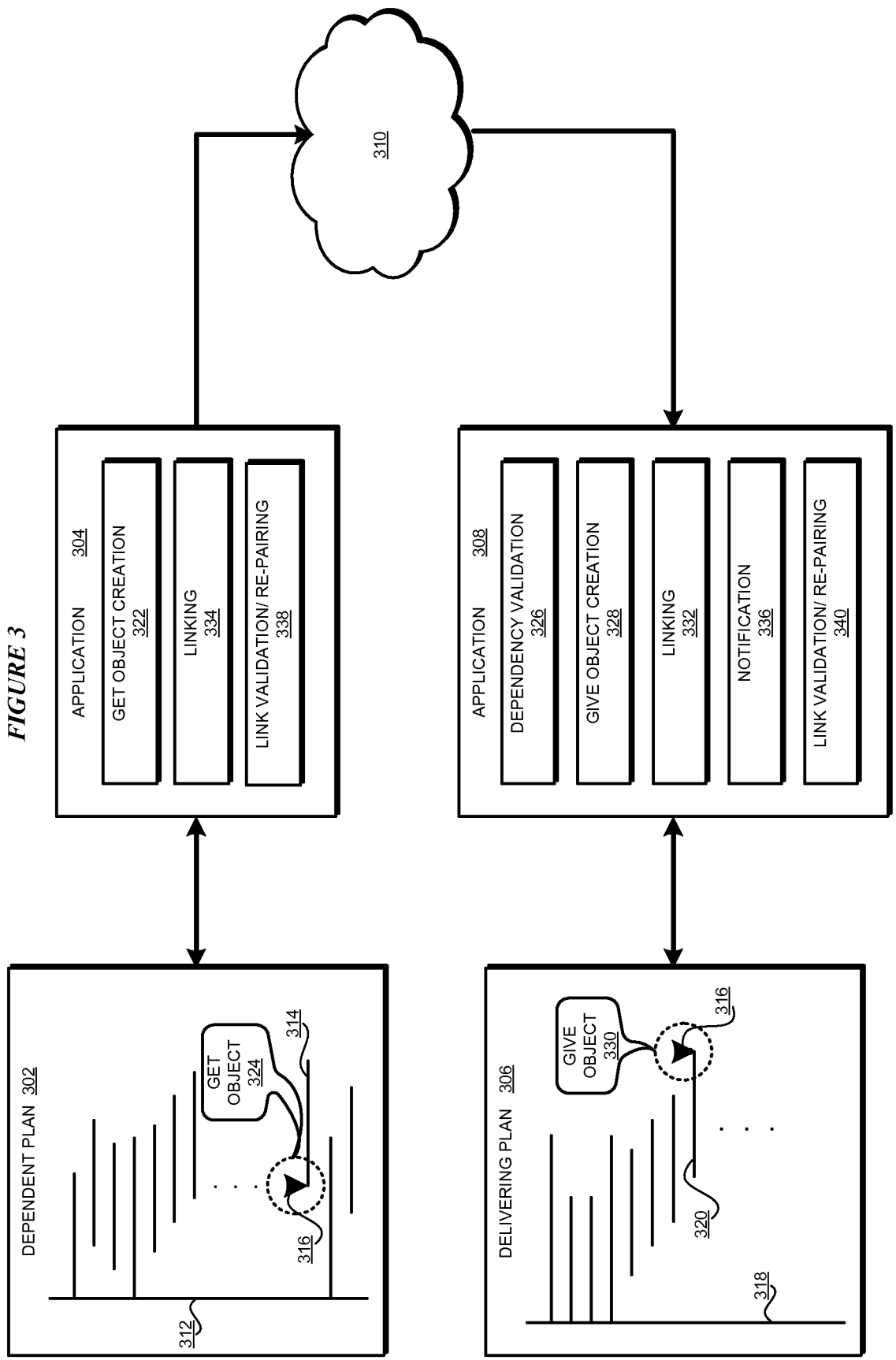
FIG. 3 depicts a block diagram of an example configuration for managing cross-project dependencies in project management applications in accordance with an illustrative embodiment.

With reference to FIG. 3, this figure depicts a block diagram of an example configuration for managing cross-project dependencies in project management applications in accordance with an illustrative embodiment. Dependent plan 302 is an example of a project plan for a subproject manages using project management application 115 in FIG. 1.

Application 304 is an example of application 105 in client 114 in FIG. 1. Delivering plan 306 is an example of a project plan of another subproject that is managed using project management application 134 in FIG. 1. Application 308 is an example of application 105 in device 132 in FIG. 1. Network 310 is an example of network 102 in FIG. 1.

Chart 312 is an example project planning chart of tasks, e.g., a Gantt chart, which includes task 314. Task 314 is dependent upon receiving deliverable 316. Deliverable 316 is produced in delivering plan 306. Chart 318 is an example project planning chart of tasks, e.g., a Gantt chart, which includes task 320. Task 320 produces deliverable 316.

Application 304 includes component 322, which creates GET object 324 in dependent plan 302. Component 322 associates GET object 324 with deliverable 316 dependency of task 314 in dependent plan 302.

Creation of GET object 324 causes application 308 to detect the creation of a dependency on delivering plan 306. For example, in one embodiment, the inclusion of an identifier of delivering plan 306 in GET object 324 causes component 326 in application 308 to detect the formation of the dependency. In another embodiment, an execution of component 322 and a value used in that execution, such as to populate GET object 324, causes component 326 in application 308 to detect the formation of the dependency. In another embodiment, component 322 broadcasts a unique plan identifier value used in creating GET object 324, causing component 326 in application 308 to detect the broadcast and conclude that the value corresponds to delivering plan 306. In another embodiment, component 322 unicasts or otherwise transmits to application 308 the unique plan identifier value used in creating GET object 324, causing component 326 in application 308 to detect the formation of the dependency on delivering plan 306.

These examples of informing about a dependency formation are not intended to be limiting. From this disclosure, those of ordinary skill in the art will be able to conceive many other manners of propagating information for a similar purpose, and the same are contemplated within the scope of the illustrative embodiments.

Component 326 detects the formation of the dependency and validates the dependency. Particularly, component 326 determines whether delivering plan 306 produces deliverable 316. In response to delivering plan 306 producing deliverable 316, as in the depicted case, component 328 creates GIVE object 330. Component 328 associates GIVE object 330 with deliverable 316 of task 320 in delivering plan 306.

Component 332 creates the link between GET object 324 and GIVE object 330. For example, in the information propagation from component 322, component 322 includes the plan identifier of dependent plan 302, the link identifier used in creating GET object 324, and a pointer or another suitable actual link to the data object corresponding to GET object 324. Using these pieces of information, component 332 populates the corresponding values in GIVE object 330.

Component 332 provides, or component 334 otherwise obtains, a pointer or another suitable actual link to the data object corresponding to GIVE object 330. For example, components 332 and 334 can exchange this information in a data transmission over network 310 in a manner described herein. Thus, the construction of GET object 324, GIVE object 330, an actual link between objects 324 and 330, and a logical link between objects 324 and 330, is complete.

In response to delivering plan 306 not producing deliverable 316, (not shown), component 336 notifies application 304 that the dependency cannot be created with delivering plan 306. Application 304 may attempt to form another dependency with another subproject plan (not shown) in this manner.

Component 338 on the side of dependent plan 302 and component 340 on the side of delivering plan 306 manage and maintain the link formed between objects 324 and 330. For example, when plan 302 is modified or migrated, link validation and re-pairing component 338 ensures that either the actual link between object 324 and object 330 is restored using the correct pointers, or at least that object 324 and object 330 are re-paired using the logical link formed by the link identifier, or both.

Note that applications 304 and 308 are shown with different configurations only for the clarity of the illustration and not as a limitation. A single application, which includes the features of applications 304 and 308 can be implemented to operate with a project management application. Depending on whether the project management application is managing a dependent plan or a delivering plan, certain features of such an application would come into play as described herein. It might also be the case that a plan is a dependent plan for some cross-project dependencies and a delivering plan for other cross-project dependencies. Thus, different features of the application would come into play for different dependencies in the plan.

Figure 4:
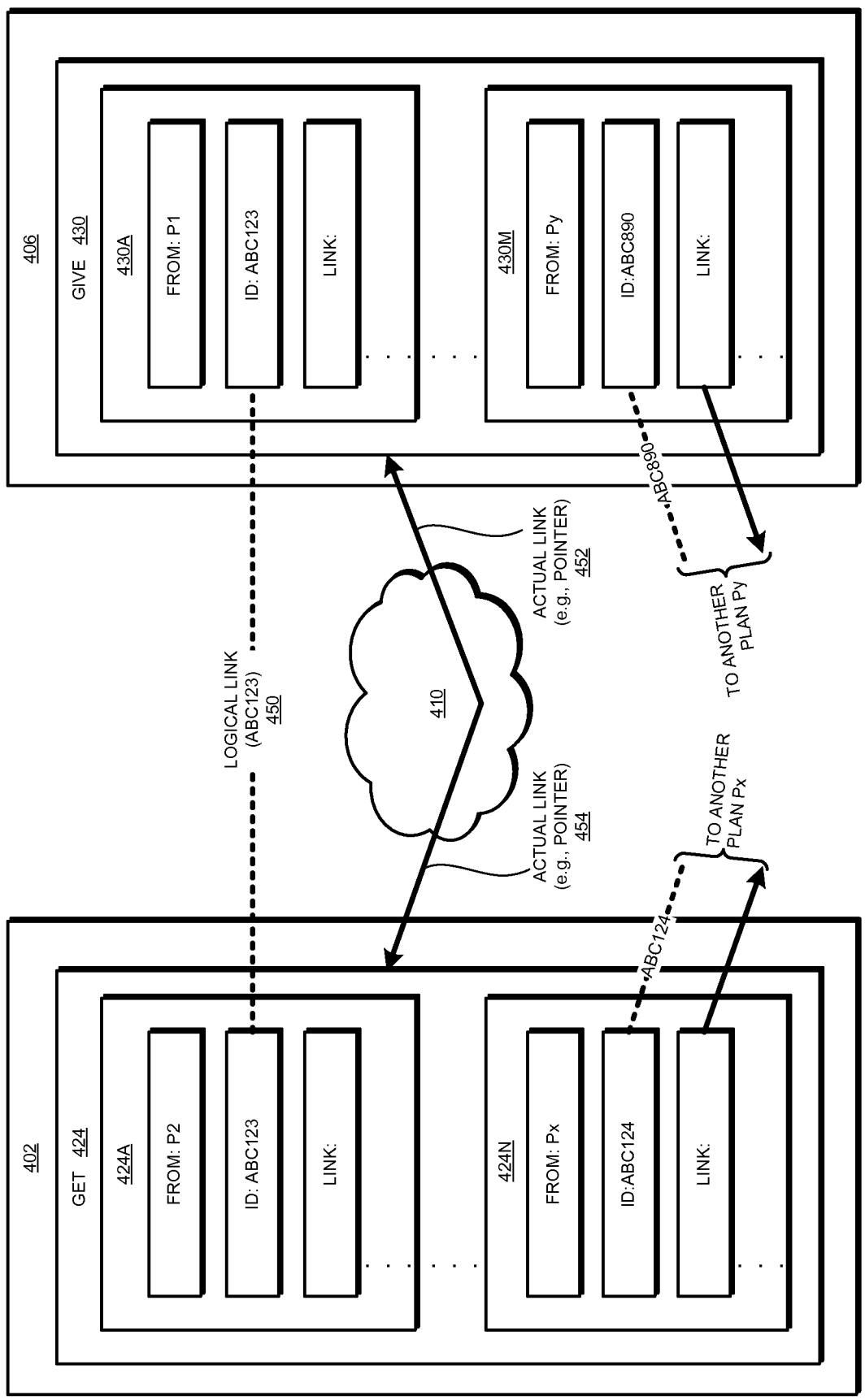
FIG. 4 depicts a block diagram of an example linking between a GET object and a GIVE object in accordance with an illustrative embodiment.

With reference to FIG. 4, this figure depicts a block diagram of an example linking between a GET object and a GIVE object in accordance with an illustrative embodiment. Dependent plan 402 (labeled "P1") is an example of dependent plan 302 in FIG. 3. Delivering plan 406 (labeled "P2") is an example of delivering plan 306 in FIG. 3. Network 410 is an example of network 310 in FIG. 3. GET object 424 in plan P1 is an example of GET object 324 in FIG. 3. GIVE object 430 in plan P2 is an example of GIVE object 330 in FIG. 3.

One GET object can be linked with one GIVE object for one deliverable. Thus, one GET object can be linked with n GIVE objects, each via a unique link identifier, in one or more delivering plans for n deliverables. Similarly, one GIVE object can be linked with one GET object to deliver one deliverable. Thus, one GIVE object can be linked with m GET objects, each via a unique link identifier, in one or more dependent plans for the same deliverable. In this manner, m GET objects can be linked with n GIVE objects across any number of dependent plans and delivering plans within a master project's ecosystem.

A GET object can be constructed to contain one or more links for dependencies. Each link for a cross-project dependency within a GET object uses a data structure in the GET object. Similarly, a GIVE object can be constructed to contain one or more links for dependencies. Each link for a cross-project dependency within a GIVE object uses a data structure in the GIVE object.

Accordingly, GET object 424 includes n data structures 424A through 424N. Similarly, GIVE object 430 includes m data structures 430A through 430M. Each such data structure includes at least three values as described herein.

Assume that data structures 424A and 430A are linked together for a cross-project dependency. FROM field of data structure 424A holds the value "P2"—the unique plan identifier of delivering plan 406. ID field of data structure 424A holds the value "ABC123"—the unique link identifier of logical link 450. LINK field of data structure 424A holds the value of pointer 452, which points to GIVE object 430 as an actual link to that GIVE object.

Similarly, FROM field of data structure 430A holds the value "P1"—the unique plan identifier of dependent plan 402. ID field of data structure 430A holds the value "ABC123"—the unique link identifier of logical link 450. LINK field of data structure 430A holds the value of pointer 454, which points to GET object 424 as an actual link to that GET object.

In this manner, other data structures of GET object 424, e.g., data structure 424N, could hold other links. For example, FROM field of data structure 424N could the value "Px"—the unique plan identifier of another delivering plan. ID field of data structure 424N could hold the value "ABC124"—the unique link identifier of a link with a GIVE object in a plan referenced by pointer Px. LINK field of data structure 424N could hold the value of a pointer to that GIVE object in the plan referenced by pointer Px.

Similarly, FROM field of data structure 430M could the value "Py"—the unique plan identifier of another dependent plan. ID field of data structure 430M could hold the value "ABC890"—the unique link identifier of a link with a GET object in a plan referenced by pointer Py. LINK field of data structure 430M could hold the value of a pointer to that GET object in the plan referenced by pointer Py.

Figure 5:
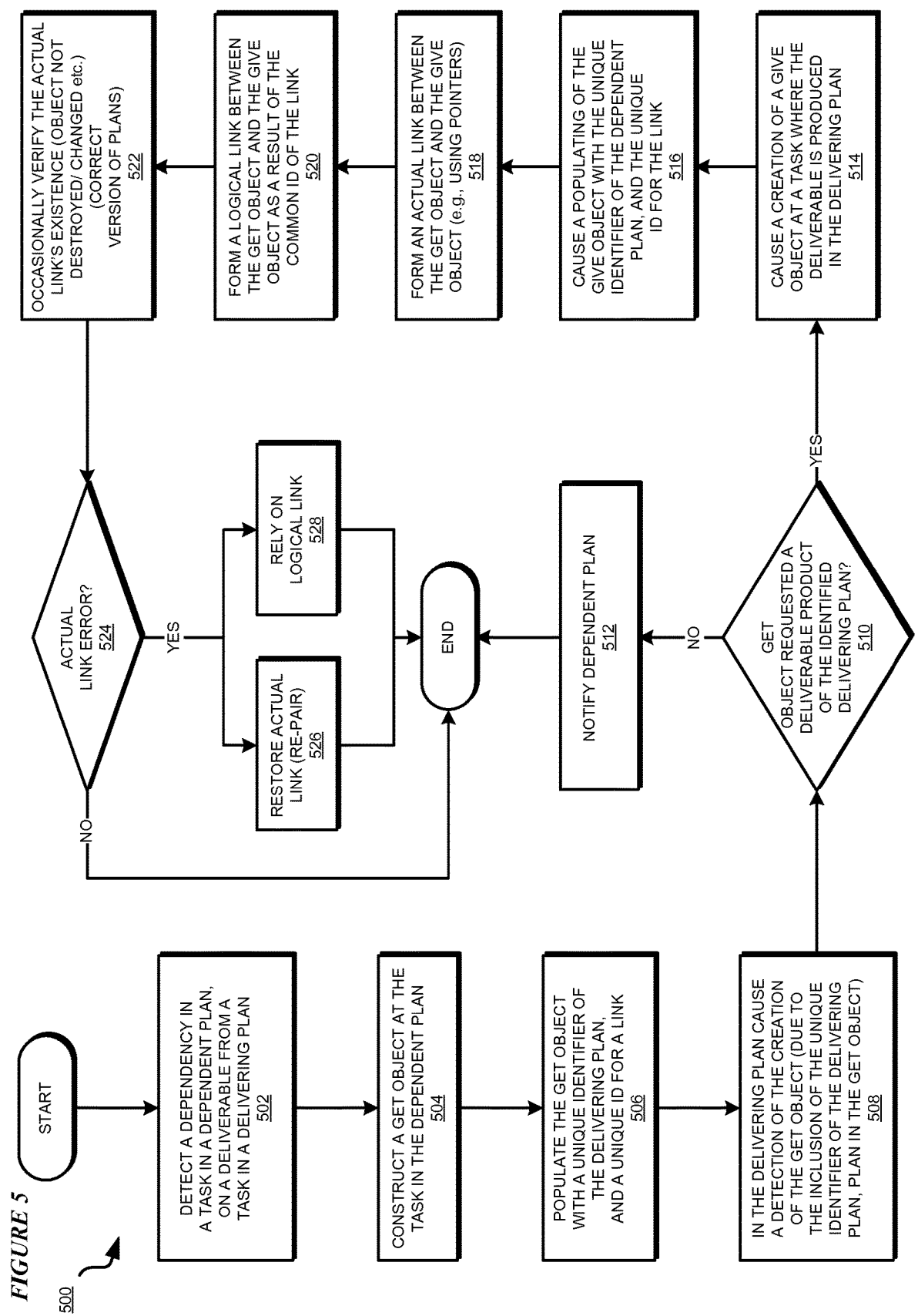
FIG. 5 depicts a flowchart of an example process for managing cross-project dependencies in project management applications in accordance with an illustrative embodiment.

With reference to FIG. 5, this figure depicts a flowchart of an example process for managing cross-project dependencies in project management applications in accordance with an illustrative embodiment. Process 500 can be implemented in an application, which implements the features described with respect to application 304 and 308 in FIG. 3.

The application detects a dependency in a task in a dependent plan, the dependency being on a deliverable from a task in a delivering plan (block 502). The application causes a construction of a GET object at the task in the dependent plan (block 504). The application causes the populating of the GET object with a plan identifier of the delivering plan and a link identifier (block 506).

The application causes, in the delivering plan a detection of the creation of the GET object at block 504 (block 508). The application causes a determination to be made at the delivering plan whether the delivering plan produces a deliverable that the GET object is requesting (block 510). If the determination is negative ("No" path of block 510), the application causes a notification to be sent from the delivering plan, and the notification to be received at the dependent plan that the dependency cannot be created (block 512). The application ends process 500 thereafter, or tries to form another dependency.

If the determination is affirmative ("Yes" path of block 510), the application causes a creation of a GIVE object at a task in the delivering plan where the requested deliverable is produced (block 514). The application causes a populating of the GIVE object with the plan identifier of the dependent plan and the link identifier used in the GET object for the dependency link (block 516).

The application forms an actual link—a project management application-specific manner of linking data objects, such as by using pointers to the objects—between the GET object and the GIVE object (block 518). The application forms a logical link between the GET object and the GIVE object, e.g., by using the same link identifier in the GET object and the GIVE object (block 520).

Occasionally, or upon an event, the application verifies the existence and validity of the actual link (block 522). For example, the actual link may be corrupted or removed, a GET object or a GIVE object may be corrupted or destroyed, or some combination thereof, as a result of a modification or modification of a delivering plan, a dependent plan, or both.

From this verification, the application determines whether there is an error in an actual link between the GET object and the GIVE object (block 524). If no error exists in the actual link ("No" path of block 524), the application ends process 500 thereafter.

If an error exists in the actual link ("Yes" path of block 524), the application attempts block 526, 528, or both. For example, the application tries to restore the actual link by re-pairing the GET object and GIVE object with the correct pointer values (block 526). Alternatively, or in conjunction with block 526, the application determines that the logical link has to be relied up (block 528). For example, when the actual link cannot be restored, the logical link becomes the only remaining link to continue with the cross-project dependency management. Or, when the actual link is restored or error-free, the logical link remains a backup method for the cross-project dependency management. The application ends process 500 thereafter.

Thus, a computer implemented method, system or apparatus, and computer program product are provided in the illustrative embodiments for managing cross-project dependencies in project management applications. Where an embodiment or a portion thereof is described with respect to a type of device, the computer implemented method, system or apparatus, the computer program product, or a portion thereof, are adapted or configured for use with a suitable and comparable manifestation of that type of device. Where an embodiment is described as implemented in an application, the delivery of the application in a Software as a Service (SaaS) model is contemplated within the scope of the illustrative embodiments. In a SaaS model, the capability of the application implementing an embodiment is provided to the consumer by executing the application on a cloud infrastructure. The application is accessible from various client devices through a thin client interface such as a web browser (e.g., web-based e-mail). The user does not manage or control the underlying cloud infrastructure including network, servers, operating systems, storage, or even the capabilities of the application, with the possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    creating, using a processor, in a first project management application, a GET object to obtain a deliverable product used in a task, the first project management application managing a dependent plan, the dependent plan including the task;
    populating, in data of the GET object, a first field using a project-wide unique plan identifier associated with a delivering plan;
    populating, in data of the GET object, a second field using a project-wide unique link identifier associated with a link for the deliverable product between the dependent plan and the delivering plan, the second field comprising a logical link;
    causing, in the delivering plan, a construction of a GIVE object corresponding to the deliverable product;
    populating, in data of the GET object, a third field with a pointer to data of a GIVE object in the delivering plan, the third field comprising an actual link; and
    managing a dependency for the deliverable product using the actual link and the logical link, the managing comprising validating the correctness of the actual link and the logical link relative to data of the GIVE object in the delivering plan, the validating comprising determining that the third field in data of the GET object points correctly to data of the GIVE object in the delivering plan and determining that the second field in data of the GET object matches the project-wide unique link identifier in data of the GIVE object in the delivering plan, the validating performed responsive to the dependent plan being updated to a later version, the validating performed responsive to the delivering plan being updated to a later version.

2. The method of claim 1, further comprising:
    verifying whether the actual link has an error, the error resulting from a moving of the first project management application to a second data processing system; and
    re-pairing, responsive to the actual link having an error, the GET object with the GIVE object by modifying at least one of (i) the reference to the GIVE object in the GET object, and (ii) the reference to the GET object in the GIVE object.

3. The method of claim 1, further comprising:
verifying whether the actual link has an error, the error resulting from a change in at least one of the GET object and the GIVE object; and
re-pairing, responsive to the actual link having an error, the GET object with the GIVE object by modifying at least one of (i) the reference to the GIVE object in the GET object, and (ii) the reference to the GET object in the GIVE object.

4. The method of claim 3, wherein the change is a deletion of a GIVE object.

5. The method of claim 3, wherein the change is a corruption of the GET object.

6. The method of claim 1, further comprising:
verifying whether the actual link has an error; and
using, responsive to failing to restore the actual link, only the logical link to continue managing the dependency.

7. The method of claim 1, wherein the reference is usable to access the GIVE object over a data network from the GET object.

8. The method of claim 1, wherein second project management application manages the delivering plan, the delivering plan including a task that provides the deliverable product, wherein the first project management application executes in a first data processing system, and wherein the second project management application executes in a second data processing system.

9. The method of claim 1, further comprising:
causing a populating, in the GIVE object, of a first field using a project-wide unique plan identifier associated with a dependent plan.

10. The method of claim 9, further comprising:
causing a determination of whether the delivering plan can provide the deliverable product, wherein the populating of the first field in the GIVE object is responsive to determining that the delivering plan can provide the deliverable product.

11. The method of claim 1, further comprising:
creating in the first project management application a second GET object to obtain a second deliverable product from a second delivering plan in a third project management application;
causing a determination of whether the second delivering plan can provide the second deliverable product;
causing a notification to be produced from the second delivering plan that a second dependency for the second deliverable product cannot be created; and
destroying, responsive to the notification, the second GET object.

12. The method of claim 1, further comprising:
detecting, in the task in the dependent plan, a creation of a dependency on the deliverable product.

13. A computer program product comprising one or more computer-readable storage devices, and program instructions stored on at least one of the one or more storage devices, the stored program instructions comprising:
program instructions to create, using a processor, in a first project management application, a GET object to obtain a deliverable product used in a task, the first project management application managing a dependent plan, the dependent plan including the task;
program instructions to populate, in data of the GET object, a first field using a project-wide unique plan identifier associated with a delivering plan;
program instructions to populate, in data of the GET object, a second field using a project-wide unique link identifier associated with a link for the deliverable product between the dependent plan and the delivering plan, the second field comprising a logical link;
program instructions to cause, in the delivering plan, a construction of a GIVE object corresponding to the deliverable product;
program instructions to populate, in data of the GET object, a third field with a pointer to data of a GIVE object in the delivering plan, the third field comprising an actual link; and
program instructions to manage a dependency for the deliverable product using the actual link and the logical link, the managing comprising validating the correctness of the actual link and the logical link relative to data of the GIVE object in the delivering plan, the validating comprising determining that the third field in data of the GET object points correctly to data of the GIVE object in the delivering plan and determining that the second field in data of the GET object matches the project-wide unique link identifier in data of the GIVE object in the delivering plan, the validating performed responsive to the dependent plan being updated to a later version, the validating performed responsive to the delivering plan being updated to a later version.

14. The computer program product of claim 13, the stored program instructions further comprising:
program instructions to verify whether the actual link has an error, the error resulting from a moving of the first project management application to a second data processing system; and
program instructions to re-pair, responsive to the actual link having an error, the GET object with the GIVE object by modifying at least one of (i) the reference to the GIVE object in the GET object, and (ii) the reference to the GET object in the GIVE object.

15. The computer program product of claim 13, the stored program instructions further comprising:
program instructions to verify whether the actual link has an error, the error resulting from a change in at least one of the GET object and the GIVE object; and
program instructions to re-pair, responsive to the actual link having an error, the GET object with the GIVE object by modifying at least one of (i) the reference to the GIVE object in the GET object, and (ii) the reference to the GET object in the GIVE object.

16. The computer program product of claim 15, wherein the change is a deletion of a GIVE object.

17. The computer program product of claim 15, wherein the change is a corruption of the GET object.

18. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to create, using a processor, in a first project management application, a GET object to obtain a deliverable product used in a task, the first project management application managing a dependent plan, the dependent plan including the task;
program instructions to populate, in data of the GET object, a first field using a project-wide unique plan identifier associated with a delivering plan;
program instructions to populate, in data of the GET object, a second field using a project-wide unique link identifier associated with a link for the deliverable product between the dependent plan and the delivering plan, the second field comprising a logical link;

program instructions to cause, in the delivering plan, a construction of a GIVE object corresponding to the deliverable product;

program instructions to populate, in data of the GET object, a third field with a pointer to data of a GIVE object in the delivering plan, the third field comprising an actual link; and program instructions to manage a dependency for the deliverable product using the actual link and the logical link, the managing comprising validating the correctness of the actual link and the logical link relative to data of the GIVE object in the delivering plan, the validating comprising determining that the third field in data of the GET object points correctly to data of the GIVE object in the delivering plan and determining that the second field in data of the GET object matches the project-wide unique link identifier in data of the GIVE object in the delivering plan, the validating performed responsive to the dependent plan being updated to a later version, the validating performed responsive to the delivering plan being updated to a later version.

19. The computer usable program product of claim 13, wherein the computer usable code is stored in a computer readable storage device in a data processing system, and wherein the computer usable code is transferred over a network from a remote data processing system.

20. The computer usable program product of claim 13, wherein the computer usable code is stored in a computer readable storage device in a server data processing system, and wherein the computer usable code is downloaded over a network to a remote data processing system for use in a computer readable storage device associated with the remote data processing system.

* * * * *